US012346135B2

(12) United States Patent
Gebauer

(10) Patent No.: US 12,346,135 B2
(45) Date of Patent: Jul. 1, 2025

(54) BIOPROCESS FLUID MIXING SYSTEM

(71) Applicant: Cytiva Sweden AB, Uppsala (SE)

(72) Inventor: Klaus Gebauer, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 416 days.

(21) Appl. No.: 17/777,590

(22) PCT Filed: Dec. 11, 2020

(86) PCT No.: PCT/EP2020/085767
§ 371 (c)(1),
(2) Date: May 17, 2022

(87) PCT Pub. No.: WO2021/122376
PCT Pub. Date: Jun. 24, 2021

(65) Prior Publication Data
US 2023/0014015 A1    Jan. 19, 2023

(30) Foreign Application Priority Data
Dec. 19, 2019    (GB) ...................................... 1918890

(51) Int. Cl.
*G05D 11/13*    (2006.01)
*G01N 30/32*    (2006.01)
(Continued)

(52) U.S. Cl.
CPC ........... *G05D 11/139* (2013.01); *G01N 30/32* (2013.01); *G01N 30/34* (2013.01); *G01N 2030/347* (2013.01); *G01N 2030/8809* (2013.01)

(58) Field of Classification Search
CPC ...... G05D 11/139; G05D 11/13; G01N 30/32; G01N 30/34; G01N 2030/347;
(Continued)

(56) References Cited

U.S. PATENT DOCUMENTS 10,598,640 B2 *  3/2020  Malmquist ......... G01N 30/8624
2007/0144977 A1   6/2007  Kitagawa
(Continued)

FOREIGN PATENT DOCUMENTS

CN    202582614 U    12/2012
CN    108363429 A    8/2018
(Continued)

OTHER PUBLICATIONS

WO 2020161911 Translation (Year: 2019).*
(Continued)

*Primary Examiner* — John Kim
(74) *Attorney, Agent, or Firm* — Eversheds-Sutherland (US) LLP

(57) ABSTRACT

A bioprocess fluid mixing system (3; 3'; 3"; 103; 103'), said fluid mixing system (3; 3'; 3"; 103; 103') comprising:—at least two fluid inlets (5a, 5b, 5c, 5d, 5e), configured for providing a first fluid into the fluid mixing system through a first fluid inlet (5a) and for providing a second fluid into the fluid mixing system through a second fluid inlet (5b);—at least one valve arrangement (13a, 13b, 13c, 13a'), where a first valve arrangement (13a; 13a') is in fluid communication with at least both the first fluid inlet (5a) and the second fluid inlet (5b);—at least two pumps (11a, 11b, 11c, 11d, 11e), where a first pump (11a) is in selective fluid communication with at least both the first and the second fluid inlets (5a, 5b) via the first valve arrangement (13a; 13a') and a second pump (11b) is in fluid communication with at least one of the first and second fluid inlet (5b); and—a common fluid outlet (14) which is in fluid communication with both an outlet (15a) of the first pump (11a) and an outlet (15b) of the second pump (11b), wherein pump rates of the at least two pumps (11a, 11b) and valve positions in the at least one valve arrangement (13a; 13a'; 13b, 13c)
(Continued)

are configured to be controllable by a control system (21) such that mixing of at least a first fluid from the first fluid inlet (5a) and a second fluid from the second fluid inlet (5b) can be performed to a requested mixing of the at least two fluids and to a requested combined fluid flow rate at the common fluid outlet (14).

18 Claims, 9 Drawing Sheets

(51) Int. Cl.
*G01N 30/34* (2006.01)
*G01N 30/88* (2006.01)

(58) Field of Classification Search
CPC ........... G01N 2030/8809; G01N 30/02; G01N 30/72; G04D 11/139
See application file for complete search history.

(56) References Cited

U.S. PATENT DOCUMENTS

| | | |
|---|---|---|
| 2008/0047611 A1 | 2/2008 | Stemer |
| 2009/0205409 A1 | 8/2009 | Ciavarini |
| 2012/0103073 A1* | 5/2012 | Bystron ................. G01N 30/34 222/25 |
| 2013/0048095 A1 | 2/2013 | Wikfors et al. |
| 2015/0043303 A1 | 2/2015 | Shreve et al. |
| 2015/0059451 A1 | 3/2015 | Witt et al. |
| 2015/0168958 A1 | 6/2015 | Downie |
| 2016/0282318 A1 | 9/2016 | Malmquist |
| 2019/0009215 A1 | 1/2019 | Heise |

FOREIGN PATENT DOCUMENTS

| | | | |
|---|---|---|---|
| EP | 2667277 A1 | 11/2013 | |
| JP | 2021521695 A | 8/2021 | |
| WO | 2011037530 A1 | 3/2011 | |
| WO | WO-2020161911 A1 * | 8/2020 | .............. G06F 11/34 |
| WO | 2020240780 A1 | 12/2020 | |

OTHER PUBLICATIONS

PCT International Search Report and Written Opinion for PCT/EP2020/085767, mailed, Apr. 21, 2021 (13 pages).

GB Search Report for Application No. 1918890.3, mailed, Jun. 22, 2020 (3 pages).

Japanese Office Action for JP2022-537794, mailed, Aug. 5, 2024 (6 pages).

CN Office Action and Search Report for corresponding CN Application No. 202080087638.7, mailed Dec. 17, 2024, 20 pages.

* cited by examiner

BIOPROCESS FLUID MIXING SYSTEM

CROSS REFERENCE TO RELATED APPLICATIONS

This application claims the priority benefit of PCT/EP2020/085767, filed Dec. 11, 2020, which claims the priority benefit to GB Application No. 1918890.3, filed Dec. 19, 2019, the entire contents of which are incorporated herein by reference.

TECHNICAL FIELD OF THE INVENTION

The present invention relates to a bioprocess fluid mixing system, a method for mixing fluids in a bioprocess fluid mixing system, a bioprocess system, a control system connectable to a bioprocess fluid mixing system and to a computer program product.

BACKGROUND

In bioprocess systems such as for example chromatography systems, fluid mixing is often required to adjust the composition of fluids. For achieving fluid mixing functionality with bioprocess systems, it is common practice to connect one pump to each fluid inlet for the fluids to be mixed. See for example FIG. 1a which shows a prior art chromatography system 401 with a fluid mixing system 403. Such a systems is typically described as a gradient formation system, because the composition of the fluid blend may be gradually increased or decreased with time to increase or decrease the strength of component relevant to the separation process. A first inlet 405a is connected to a first pump 411a and a second inlet 405b is connected to a second pump 411b. The outlets of the first and second pumps are then connected to a common outlet 414 for mixing a first fluid provided through the first inlet 405a and a second fluid provided through the second inlet 405b downstream of the pumps. FIG. 1b shows a prior art chromatography system 501 comprising a fluid mixing system 503 in the form of an inline conditioning system. The inline conditioning system has typically three or more pumps and allows to accomplish a variety of tasks depending on the application, for example in-line dilution of a concentrate that is fed to the mixing system or the preparation of a desired buffer composition on basis of mixing water with acid, base and/or salt. An inline conditioning system may be an integrated part of another system, as shown here in the example of the chromatography system 501, where a buffer can be prepared continuously, in real time and at the point of use. An inline conditioning system such as system 503 may also be provided and operated stand-alone, for example for preparing a desired volume of buffer that may be stored in a vessel. A first inlet 505a is connected to a first pump 511a, a second inlet 505b is connected to a second pump 511b, a third inlet 505c is connected to a third pump 511c, a fourth inlet 505d is connected to a fourth pump 511d and a fifth inlet 505e is connected to a fifth pump 511e. The outlets of the pumps are then connected to a common outlet 514 for mixing of fluids provided through the different inlets 505a-505e.

A problem with these types of fluid mixing systems is that the operating range at low flow rates is limited. If two or more fluids should be mixed, then the combined flow rate output when operating the respective pumps together will obviously always be larger than the lowest flow rate that can be achieved when operating a single pump and pumping fluid from a single fluid inlet. Another problem with these types of fluid mixing systems is that the volumetric mixing ratio that can be accomplished is strongly depending on the operating flow rate and thus the combined total output from said pumps. For example, when having two pumps with the same lowest flow rate, only a mixing ratio comprising 50% of each component, equivalent to a 1+1 mixture can be achieved at twice the flow rate of the individual pumps. However, if a 1+9 mixture shall be achieved, then the pump providing the fluid adjusted to provide 90% of the total fluid flow needs to be run at least with a flow rate 9 times said lowest pump flow rate to achieve the 1+9 mixture at a flow rate equal or larger than 10 times said lowest flow rate. As a result, the operating range of prior art systems is strongly limited in regard to lowest flow rates and in regard to accomplishing a wide range of mixing ratios over a wide range of flow rates.

SUMMARY

An object of the present invention is to provide a bioprocess fluid mixing system having a larger operating range and a method for mixing fluids in a bioprocess system over a larger operating range.

A further object of the invention is to provide a bioprocess fluid mixing system which can provide a more flexible mixing capability over a wider flow rate range.

A further object of the invention is to provide an improved method for mixing fluids and an improved bioprocess fluid mixing system which provides a flexible and precise mixing capability.

This is achieved in a bioprocess fluid mixing system, a method for mixing fluids in a bioprocess fluid mixing system, a bioprocess system, a control system connectable to a bioprocess fluid mixing system and in a computer program product according to the independent claims.

According to one aspect of the invention a bioprocess fluid mixing system is provided, said fluid mixing system comprising:

- at least two fluid inlets, configured for providing a first fluid into the fluid mixing system through a first fluid inlet and for providing a second fluid into the fluid mixing system through a second fluid inlet;
- at least one valve arrangement, where a first valve arrangement is in fluid communication with at least both the first fluid inlet and the second fluid inlet;
- at least two pumps, where a first pump is in selective fluid communication with at least both the first and the second fluid inlets via the first valve arrangement and a second pump is in fluid communication with at least one of the first and second fluid inlet; and
- a common fluid outlet which is in fluid communication with both an outlet of the first pump and an outlet of the second pump,
- wherein pump rates of the at least two pumps and valve positions in the at least one valve arrangement are configured to be controllable by a control system such that mixing of at least a first fluid from the first fluid inlet and a second fluid from the second fluid inlet can be performed to a requested mixing of the at least two fluids and to a requested combined fluid flow rate at the common fluid outlet.

According to another aspect of the invention a method for mixing fluids in a bioprocess fluid mixing system according to above is provided, wherein said method comprises controlling pump rates of the at least two pumps and valve positions in the at least one valve arrangement such that mixing of at least a first fluid from the first fluid inlet and a second fluid from the second fluid inlet to a requested mixing of the at least two fluids and to a requested combined fluid flow rate at the common fluid outlet can be performed.

According to another aspect of the invention a bioprocess system comprising a bioprocess fluid mixing system according to above is provided.

According to another aspect of the invention a control system connectable to a bioprocess fluid mixing system according to above is provided, wherein said control system is configured to control the at least two pumps and the at least one valve arrangement according to the method as described above.

According to another aspect of the invention a computer program product comprising instructions which, when executed in a processor in a control system connected to a fluid mixing system according to above, cause the control system to perform the method according to above is provided.

Hereby, a fluid mixing system and a method for mixing fluids are provided in which mixing of fluids can be provided both upstream and downstream of the pumps. Upstream mixing is possible thanks to the first valve arrangement. Hereby the flow rate range in which the fluid mixing system can operate is greatly extended. The lowest possible flow rate is the same as the lowest flow rate for one pump instead of the sum of the lowest flow rate for two or more pumps. Further, the combination of upstream and downstream mixing allows to greatly extend the range of mixing ratios in between the fluids as the mixing ratio is defined by the differences in pump flow as well as the differences average in fluid volume and/or volumetric flow provided to the inlets of the valve arrangement(s) providing the upstream mixing. Furthermore, a more flexible fluid mixing system is achieved in which different fluid components can be mixed in a more effective and precise way with this new invention. Both fluid flow rate, volumetric mixing ratio and a requested fluid property of the fluid mixture resulting from the different fluid components can be better controlled with this new invention.

For low flow rates, all different mixing ratios between the components can be achieved, and even with only one pump working alone, and in contrast to prior art systems as the ones shown in FIGS. 1a and 1b where mixing ratios different from 1+1 blending can only be achieved at flow rates greater than the combined lowest flow capacities of the two pumps involved.

For high flow rates all different mixing ratios between the components can be achieved also when both pumps are working at their maximum capacity thanks to the valve arrangement and in contrast to prior art systems as the ones shown in FIGS. 1a and 1b where only a 50% mixing can be performed at a maximum flow rate if the two pumps have the same maximum flow capacity.

In some embodiments of the invention pump rates of the at least two pumps and valve positions in the at least one valve arrangement are configured to be controllable by a control system such that mixing of at least a first fluid from the first fluid inlet and a second fluid from the second fluid inlet to the requested mixing of the at least two fluids and to a requested combined fluid flow rate at the common fluid outlet can be performed both upstream of at least the first pump and downstream of the at least two pumps.

In some embodiments of the invention the requested mixing of the at least two fluids is a requested volumetric mixing ratio of the at least two fluids and/or a mixing with one or more requested resultant fluid properties and/or a mixing with one or more requested changing resultant fluid properties.

In some embodiments of the invention a requested resultant fluid property or changing resultant fluid property is a resultant pH.

In some embodiments of the invention the second pump is connected to both the first and second fluid inlets via a second valve arrangement provided in the fluid mixing system.

In some embodiments of the invention the fluid mixing system is configured for gradient formation, buffer preparation or inline conditioning in a bioprocess system.

In some embodiments of the invention the at least one valve arrangement comprises at least two inlets and one outlet and is optionally a switch valve or a proportional or modulating flow valve.

In some embodiments of the invention the bioprocess fluid mixing system further comprises a mixer connected to the common fluid outlet.

In some embodiments of the invention the bioprocess fluid mixing system further comprises at least one sensor arrangement which is connectable to the control system, said sensor arrangement being configured for measuring one or more fluid properties of the mixed at least first and second fluids and/or fluid flow rates in one or more positions in the system, whereby a control system can provide a feedback control to the at least two pumps and/or to the at least one valve arrangement based on output from the sensor arrangement.

In some embodiments of the invention the method is a method for gradient formation, buffer preparation or inline conditioning in a bioprocess system.

In some embodiments of the invention the method further comprises the steps of sensing at least one property in the fluid at one or more different positions in the fluid mixing system and controlling one or more of the at least two pumps and the at least one valve arrangement in dependence of the sensed at least one property in order to achieve a requested mixing between at least the first and second fluids and/or a requested combined fluid flow rate.

Further embodiments are described in the dependent claims and in the detailed description.

DETAILED DESCRIPTION OF EMBODIMENTS

Figure 2A:
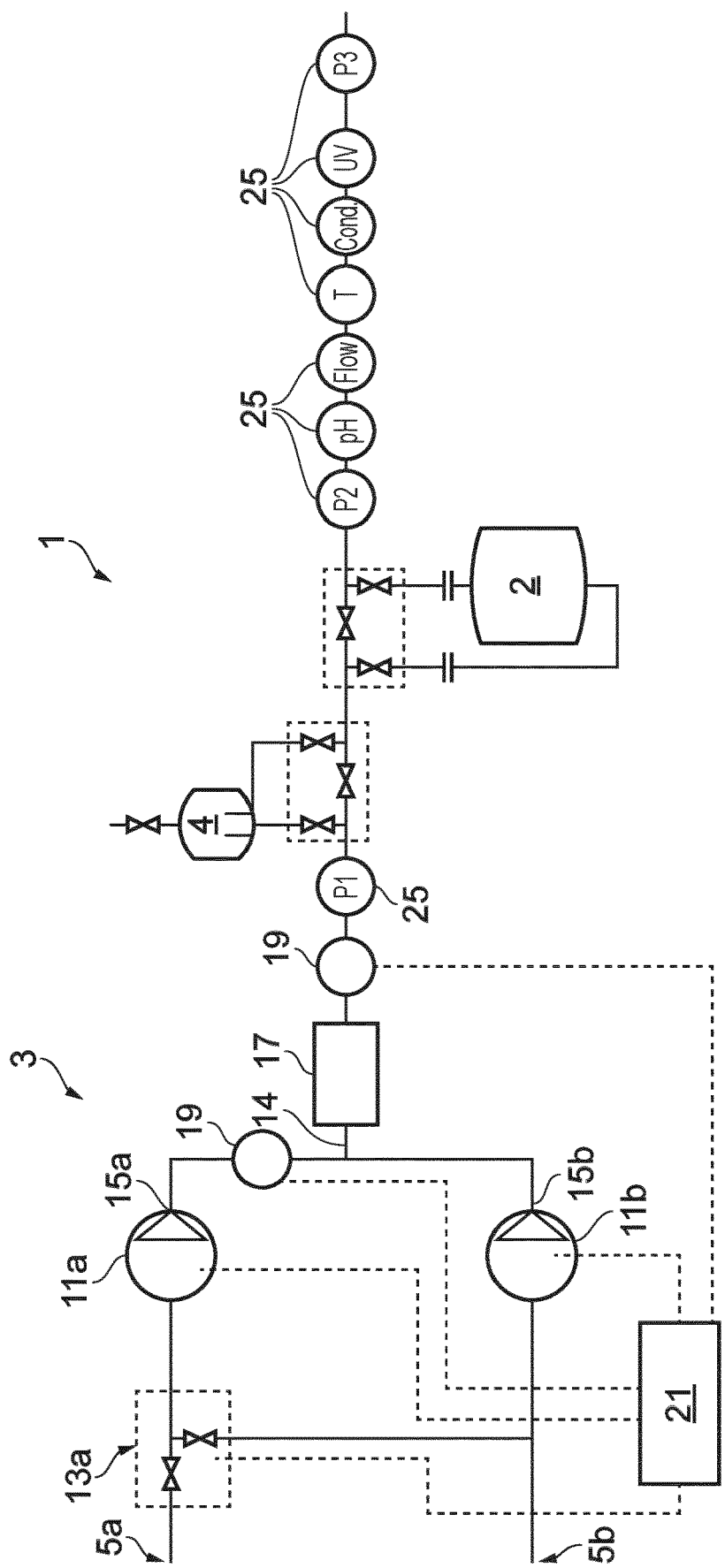
FIG. 2a shows schematically a bioprocess system comprising a fluid mixing system according to one embodiment of the invention.
Figure 2B:
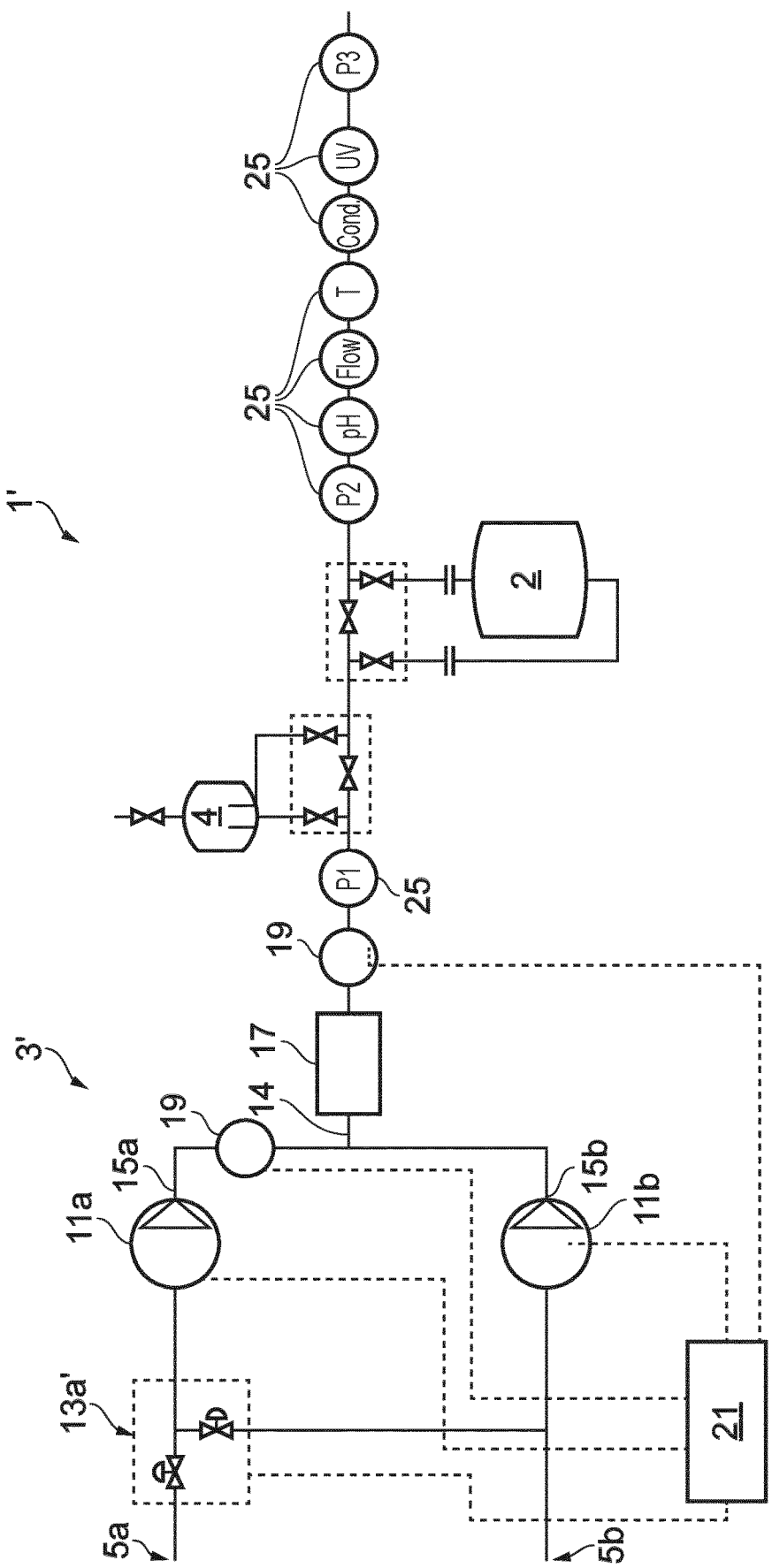
FIG. 2b shows schematically a bioprocess system comprising a fluid mixing system according to another embodiment of the invention.
Figure 2C:
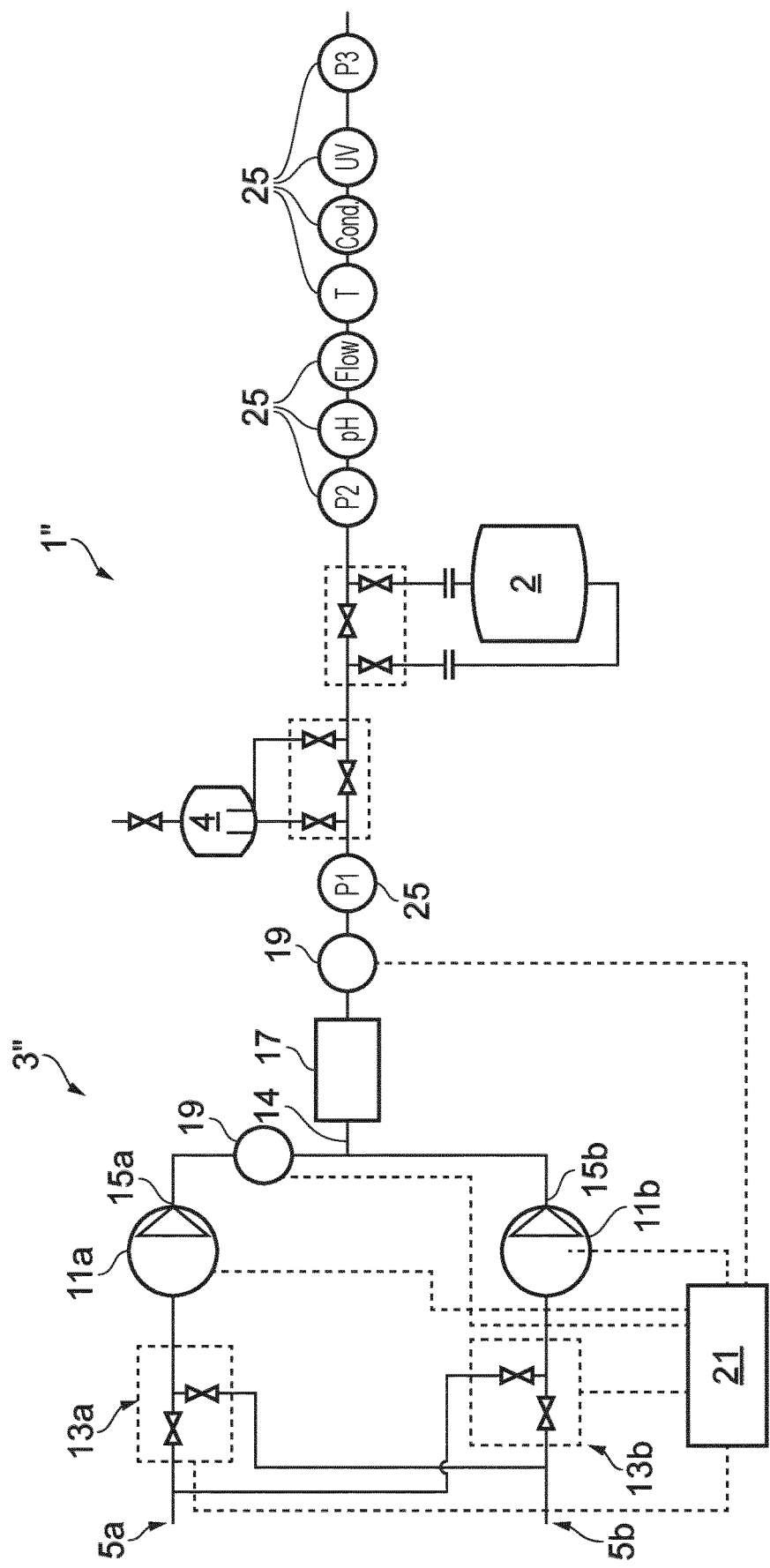
FIG. 2c shows schematically a bioprocess system comprising a fluid mixing system according to another embodiment of the invention.
Figure 3A:
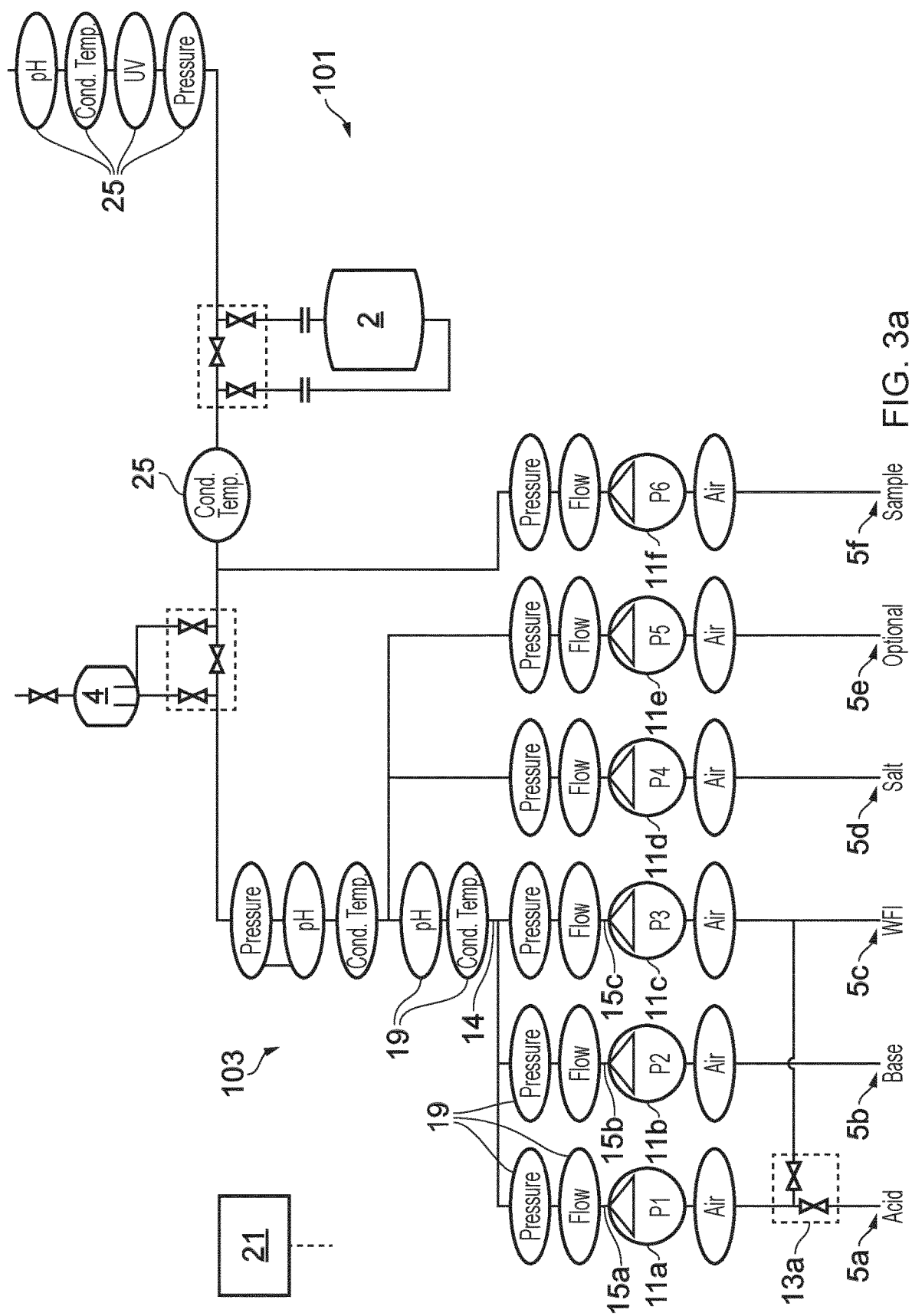
FIG. 3a shows schematically a bioprocess system comprising a fluid mixing system according to another embodiment of the invention.
Figure 3B:
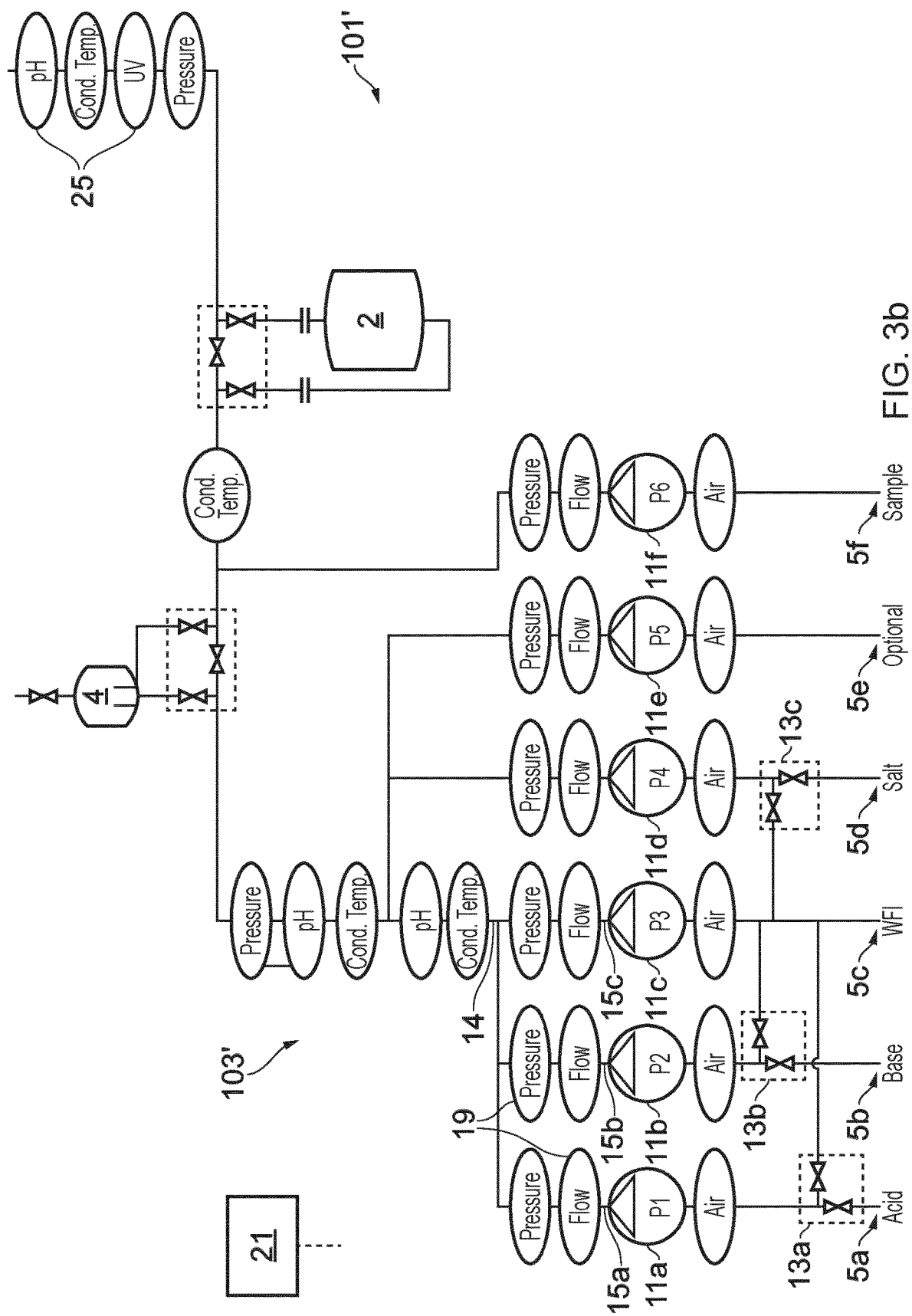
FIG. 3b shows schematically a bioprocess system comprising a fluid mixing system according to another embodiment of the invention.

FIGS. 2a-c show three different embodiments of a bioprocess fluid mixing system 3; 3'; 3" provided in a bioprocess system 1; 1'; 1" according to the invention, with the example of the bioprocess system 1; 1'; 1" being a chromatography system. FIGS. 3a-b show a bioprocess system 101; 101', with example of the bioprocess system 101; 101' being a chromatography system, comprising a bioprocess fluid mixing system 103; 103' in the form of an inline conditioning system according to two different embodiments of the invention. Similar components are given the same reference numbers and are described only once with reference to all FIGS. 2a-c and 3a-b. The bioprocess system 1, 1'; 1"; 101; 101' is here a chromatography system to which a chromatography column 2 can be connected. The chromatography system 1; 1'; 1"; 101; 101' comprises also often an air trap 4 and a number of different sensors 25, such as one or more of pressure sensor, pH sensor, flow sensor, temperature sensor, conductivity sensor and UV sensor. The bioprocess system could be another system than a chromatography system, such as for example a bioreactor, a filtration system etc., i.e. the bioprocess fluid mixing system 3; 3'; 3"; 103; 103' according to the invention could as well be used in another type of bioprocess system than a chromatography system. In other embodiments, the bioprocess fluid mixing system may be provided standalone and not integrated with another system and unit operation.

The bioprocess fluid mixing system 3; 3'; 3"; 103; 103' according to the invention comprises:
- at least two fluid inlets 5a, 5b, 5c, 5d, 5e, configured for providing a first fluid into the fluid mixing system through a first fluid inlet 5a and for providing a second fluid into the fluid mixing system through a second fluid inlet 5b;
- at least one valve arrangement 13a, 13b, 13c, 13a', where a first valve arrangement 13a; 13a' is in fluid communication with at least both the first fluid inlet 5a and the second fluid inlet 5b;
- at least two pumps 11a, 11b, 11c, 11d, 11e, where a first pump 11a is in selective fluid communication with at least both the first and the second fluid inlets 5a, 5b via the first valve arrangement 13a; 13a', whereby the first valve arrangement 13a; 13a' is provided upstream the first pump 11a, and a second pump 11b is in fluid communication with at least one of the first and second fluid inlet 5b; and
- a common fluid outlet 14 which is in fluid communication with at least an outlet 15a of the first pump 11a and an outlet 15b of the second pump 11b.

Pump rates of the at least two pumps 11a, 11b, 11c, 11d, 11e and valve positions in the at least one valve arrangement 13a; 13a'; 13b; 13c are configured to be controllable by a control system 21 such that mixing of at least a first fluid from the first fluid inlet 5a and a second fluid from the second fluid inlet 5b can be performed to a requested mixing of the at least two fluids and to a requested combined fluid flow rate at the common fluid outlet 14 can be performed. A requested mixing of the at least two fluids can be a requested volumetric mixing ratio of the at least two fluids and/or a mixing with one or more requested resultant fluid properties and/or a mixing with one or more requested changing resultant fluid properties. The resultant fluid property can for example be pH. Volumetric mixing ratio means any ratio of two or more fluids, and includes a controller-requested mix or mixture which has that ratio or has a predefined resultant property of that ratio.

In the embodiments shown in FIGS. 2a-2c only two pumps 11a, 11b are provided in the fluid mixing system which pumps are called a first pump 11a and a second pump 11b.

Likewise only two fluid inlets 5a, 5b are provided which are called a first fluid inlet 5a and a second fluid inlet 5b. In the embodiments shown in FIG. 3a-3b five pumps 11a, 11b, 11c, 11d, 11e are provided in the fluid mixing system and five fluid inlets 5a-5e. One additional sample pump 111 is also provided in this system. Other numbers of pumps, fluid inlets and valve arrangements are also possible within the scope of the invention.

Figure 1:
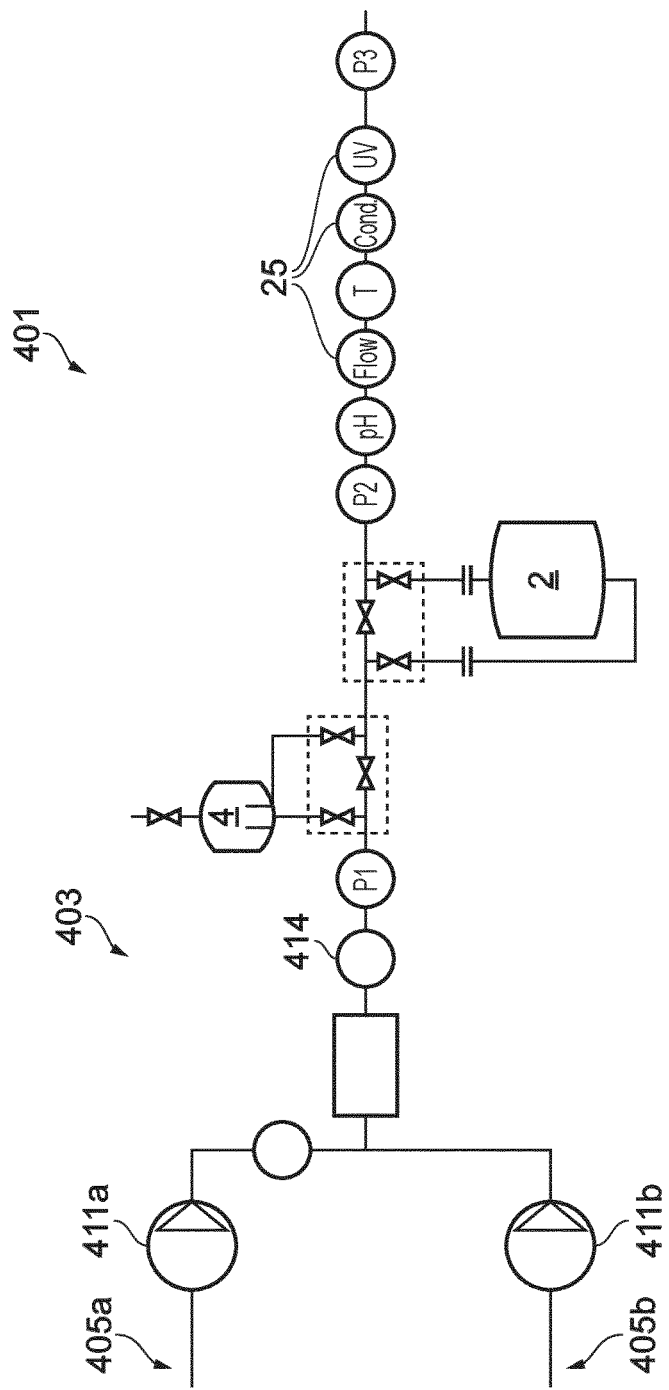
FIG. 1a shows schematically a prior art bioprocess system.
FIG. 1b shows schematically a prior art bioprocess system.
Figure 1B:
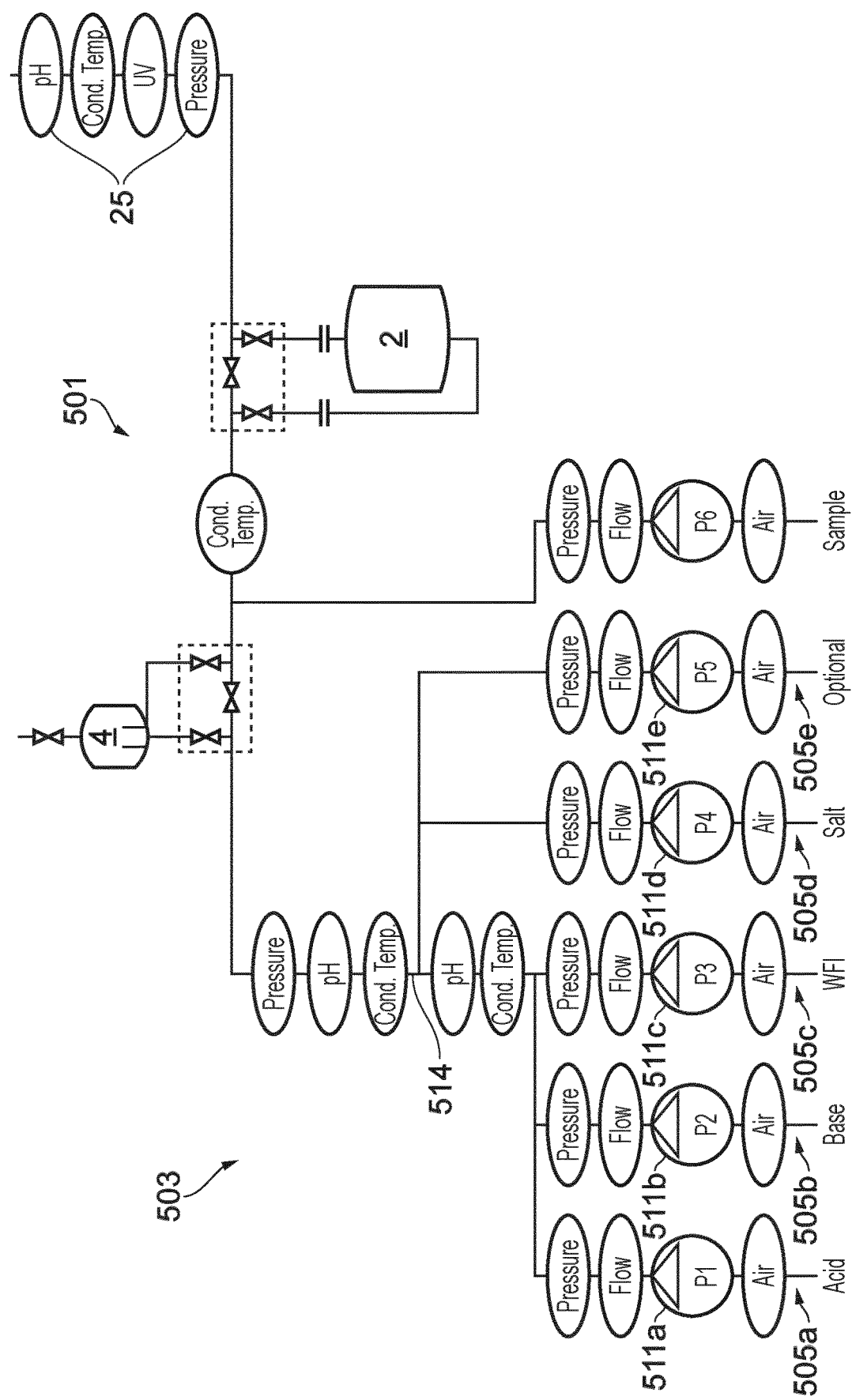

Thanks to the at least one valve arrangement 13a; 13a'; 13b; 13c mixing of at least a first fluid from the first fluid inlet 5a and a second fluid from the second fluid inlet 5b to a requested mixing of the at least two fluids, such as a requested volumetric mixing ratio or a mixing with a requested resultant fluid property, and to a requested combined fluid flow rate at the common fluid outlet 14 can be performed both upstream of at least the first pump 11a and downstream of the pumps 11a, 11b instead of only downstream of the pumps which is the case in prior art systems as the ones described with reference to FIGS. 1a and 1b. Hereby the flow rate range in which the fluid mixing system 3; 3'; 3"; 103; 103' can work is extended compared to a prior art system. The lowest possible flow rate is the same as the lowest flow rate for one pump instead of the sum of the lowest flow rate for two or more pumps as in prior art systems. This is further discussed in relation to FIG. 4 below. Furthermore, a more flexible fluid mixing system is achieved in which different fluid components can be mixed in a more effective and precise way. Both fluid flow rate and volumetric mixing ratio between the different fluid components can be better controlled with the fluid mixing system 3; 3'; 3"; 103; 103' according to the invention. For high flow rates all different mixing ratios between the components can be achieved also when both pumps are working at their maximum capacity thanks to the valve arrangement and in contrast to prior art systems as the ones shown in FIGS. 1a and 1b where only a 50% mixing can be performed at a maximum flow rate if the two pumps have the same maximum flow capacity. According to the invention the at least one valve arrangement 13a; 13a'; 13b; 13c makes it possible to redirect the fluids between the fluid inlets and the pumps such that all different mixing ratios can be achieved and the pumps can be run at all different wanted fluid flow rates. Hereby a flexible system is achieved where both volumetric mixing ratios and fluid flow rate can be optimally controlled over the whole range of possible fluid flows and mixing proportions. Depending on the type of valves used in the valve arrangements the mixing ratios can be controlled with different precision and ratios. A proportional valve could be tuned for any wanted mixing ratio. This is further discussed in relation to FIG. 4 below.

In some embodiments of the invention only one pump, for example the first pump 11a, is running for low flow rates, for example for flow rates between a first fluid flow rate and a second fluid flow rate where said first fluid flow rate is a minimum possible flow rate for one of the pumps and the second fluid flow rate is two times this minimum possible flow rate. Hereby mixing is performed only upstream of the first pump 11a in this flow rate range. Hereby the system can be run at lower flow rates than prior art systems. Hereby for some flow rates mixing may be performed only upstream by control of positions of the first valve arrangement 13a. I.e. for low flow rates, for example lower than two times a minimum possible fluid flow rate for one of the pumps. For higher flow rates both the first and second pumps 11a, 11b (or more pumps if more pumps and more fluid inlets are provided) are used. For some mixing ratios it may be suitable to only use downstream mixing, i.e. each pump is only pumping one fluid type and mixing of the fluid is performed after the pumps, i.e. downstream the pumps. An example for a situation where using primarily or solely the mixing downstream the pumps and where pumping only one fluid type by each pump may be beneficial, is when the system is equipped or limited to using valve types that are not fast or accurate enough to blend a desired fluid mixture upstream the pump, i.e. at high flow rates. In order to achieve accurate and a substantially homogeneous and continuous mixing ratio over time downstream the pumps, the accuracy and/or the responsiveness in the valve action needs to be acceptable. When switching switch valves on and off, for example, the action needs to be sufficiently fast to ensure that sufficiently small volume packages of the different fluids are alternatingly provided to the pump and the system to allow providing a smooth and averaged mixture of substantially steady state composition even at higher flow rates. One of the advantages of the system according to the invention is that upstream mixing can be utilized to accomplish extreme mixing ratios when running at low flow rates, while downstream mixing in combination with more moderate mixing ratios in upstream mixing or alternatively no upstream mixing can be used at high flow rates.

Thus, especially for higher fluid flows it is advantageous to use both downstream and upstream mixing, i.e. control both the fluid flow rate of the pumps 11a, 11b, 11c, 11d, 11e and the valve positions in the at least one valve arrangements 13a; 13a'; 13b; 13c such that one or more of the pumps will pump more than one different fluid. Hereby the system flow capacity and the different possible mixing ratios are optimized.

In some embodiments of the invention more than one of the pumps are connected via a valve arrangement to more than one of the fluid inlets. In the embodiment shown in FIG. 2c both the first pump 11a and the second pump 11b are connected to both the first and second fluid inlets 5a, 5b via a valve arrangement 13a, 13b. The first pump 11a is connected to a first valve arrangement 13a and the second pump 11b is connected to a second valve arrangement 13b. The first valve arrangement 13a is provided upstream the first pump 11a and the second valve arrangement 13b is provided upstream the second pump 11b. Hereby the flexibility of the system is even more increased. For example both the first pump 11a and the second pump 11b can be used for pumping only the first fluid or only the second fluid whereby the respective first and second fluids separately can be pumped at a maximum flow rate corresponding to a flow rate which is the sum of a maximum flow rate for the first pump 11a and a maximum flow rate of the second pump 11b.

In a fluid mixing system 3" as shown in FIG. 2c fluid mixing can be performed both upstream the first pump 11a and upstream the second pump 11b and downstream the two pumps 11a, 11b in any combination which provides a flexible system.

The fluid mixing system 3; 3'; 3"; 103; 103' according to the invention may be configured for performing for example gradient formation, buffer preparation or inline conditioning in a bioprocess system 1; 1'; 1"; 101; 101'. Gradient formation in a chromatography system is shown in FIGS. 2a-c and inline conditioning in a chromatography system is shown in FIGS. 3a-b. In such an inline conditioning system often more than two fluids are mixed and therefore also more than two pumps 11a-11e and more than two fluid inlets 5a-5e are often provided. In FIGS. 3a and 3b five pumps 11a-11e are provided each connected to one separate fluid inlet 5a-5e and one additional sample pump 111 connected to a sample inlet 5f. For example acid, base, WFI and Salt can be connected to the different fluid inlets 5a-5e as shown in FIGS. 3a and 3b.

In the fluid mixing system 103 as shown in FIG. 3a only one valve arrangement, a first valve arrangement 13a is provided. The first pump 11a is in in selective fluid communication with the first inlet 5a and the third inlet 5c via the first valve arrangement 13a. In the fluid mixing system 103' as shown in FIG. 3b three valve arrangements 13a, 13b, 13c are provided. The three valve arrangements 13a, 13b, 13c are provided connected to the different fluid inlets 5a-5d and to the pumps 11a-d such that each of the pumps 11a-11d can be connected to each of the fluid inlets 5a-5d. Hereby flexible mixing both upstream and downstream of the pumps can be provided. In this example as shown in FIG. 3b the first pump 11a is in selective fluid communication with the first inlet 5a and the third inlet 5a via a first valve arrangement 13a. The second pump 11b is in selective fluid communication with the second inlet 5b and the third inlet 5c via a second valve arrangement 13b. The fourth pump 11d is in selective fluid communication with fourth inlet 5d and the third inlet via a third valve arrangement 13c. The first pump 11a is further in fluid communication with the second fluid inlet 5b via the first and the second valve arrangements 13a, 13b and in fluid communication with the fourth fluid inlet 5d via the first and third valve arrangements 13a, 13c. The second pump 11b is further in fluid communication with the first fluid inlet 5a via the second and the first valve arrangements 13b, 13a and in fluid communication with the fourth fluid inlet 5d via the second and third valve arrangements 13b, 13c. The third pump 11c is in fluid communication with the first fluid inlet 5a via the first valve arrangement 13a, in fluid communication with the second fluid inlet 5b via the second valve arrangement 13b, in direct fluid communication with the third fluid inlet 5c and in fluid communication with the fourth fluid inlet 5d via the third valve arrangement 13c. The fourth pump 11d is further in fluid communication with the first fluid inlet 5a via the third and the first valve arrangements 13c, 13a and in fluid communication with the second fluid inlet 5d via the third and the second valve arrangements 13c, 13b.

In the systems shown in FIGS. 3a and 3b the concentrations of fluids provided into the system can be diluted by water, WFI, called inline dilution. Thanks to the present invention where upstream mixing is possible the operating range and mixing possibilities at different flow rates of the system are improved as discussed above.

The first, second and third valve arrangements 13a; 13a'; 13b; 13c used in the invention as described above comprises in some embodiments of the invention each at least two inlets and one outlet and can be for example a switch valve as shown in FIG. 2a or a proportional valve as shown in FIG. 2b. The switch valve can for example comprise a rotary valve, a rocker valve, a lever valve, a diaphragm valve, a pinch valve etc. For bioprocessing systems requiring a sanitary design and components that are easy to flush and clean, diaphragm, pinch or lever valves are commonly used.

When a switch valve is used a proportion of the first and second fluids in the mixed fluid is set by controlling the switch valve to switch between the first and second inlets 5a, 5b at a suitable frequency and for transferring a suitable amount of the respective first and second fluids to the pump. When a proportional valve 13a' is used a suitable degree of opening of the valve is selected to control the flow of each of the first and second fluids over the valve The valve is controlled for providing different proportions of the first and second fluids and can suitably be controlled by a feedback loop from a sensor arrangement 19 provided further down in the system for measuring one or more fluid properties of the mixed first and second fluids and/or fluid flow rates in one or more positions in the system.

In some embodiments of the invention the bioprocess fluid mixing system 3; 3'; 3" further comprises a mixer 17 connected to the common fluid outlet 14. Hereby the different fluid components can be further mixed effectively. Mixer 17 may especially be required for averaging the fluid composition when using switch valve arrangements upstream or when the piping arrangement downstream the mixing point cannot be provided with sufficient length and/or design to accomplish sufficient mixing in the pipework downstream the mixing point 14. Mixer 17 may be a static mixer or a dynamic mixer with some active component such as a moving mixing element, for example a rotating or oscillating stirrer.

In some embodiments of the invention the bioprocess fluid mixing system 3; 3'; 3"; 103; 103' further comprises one or more sensor arrangements 19 which are connectable to the control system 21, said sensor arrangement 19 being configured for measuring one or more fluid properties of the mixed first and second fluids and/or fluid flow rates in one or more positions in the system, whereby the control system 21 can provide a feedback control of the first and second pumps 11a, 11b and/or the first valve arrangement 13a; 13a' and possibly a second valve arrangement 13b based on output from the sensor arrangement 19.

The sensor arrangement 19 can comprise different types of sensors such as pressure sensor, flow sensor, conductivity, temperature and pH sensors. Hereby volumetric mixing ratio and/or fluid flow rate can be measured in the bioprocess fluid mixing system 3; 3'; 3"; 103; 103' which sensor information can be used for feedback control in the system.

While a flow sensor may be preferable to control a proper volumetric mixing ratio, other sensors such as a conductivity sensor, may be utilized to equally provide control over volumetric mixing ratios, provided the characteristics of the sensor response vs. concentration are known. In other embodiments, sensors may be used to provide feedback and control over properties in the mixture, which are not limited to volumetric mixing, but instead to achieving a certain condition and/or property of the mixture, which is not necessarily proportional to the volumetric composition. For example, inline conditioning systems may be used to prepare buffers with desired properties, such as for example of a certain pH. Here, a pH sensor may be utilized to control the flow rates and volumetric blending of different fluids.

Figure 4:
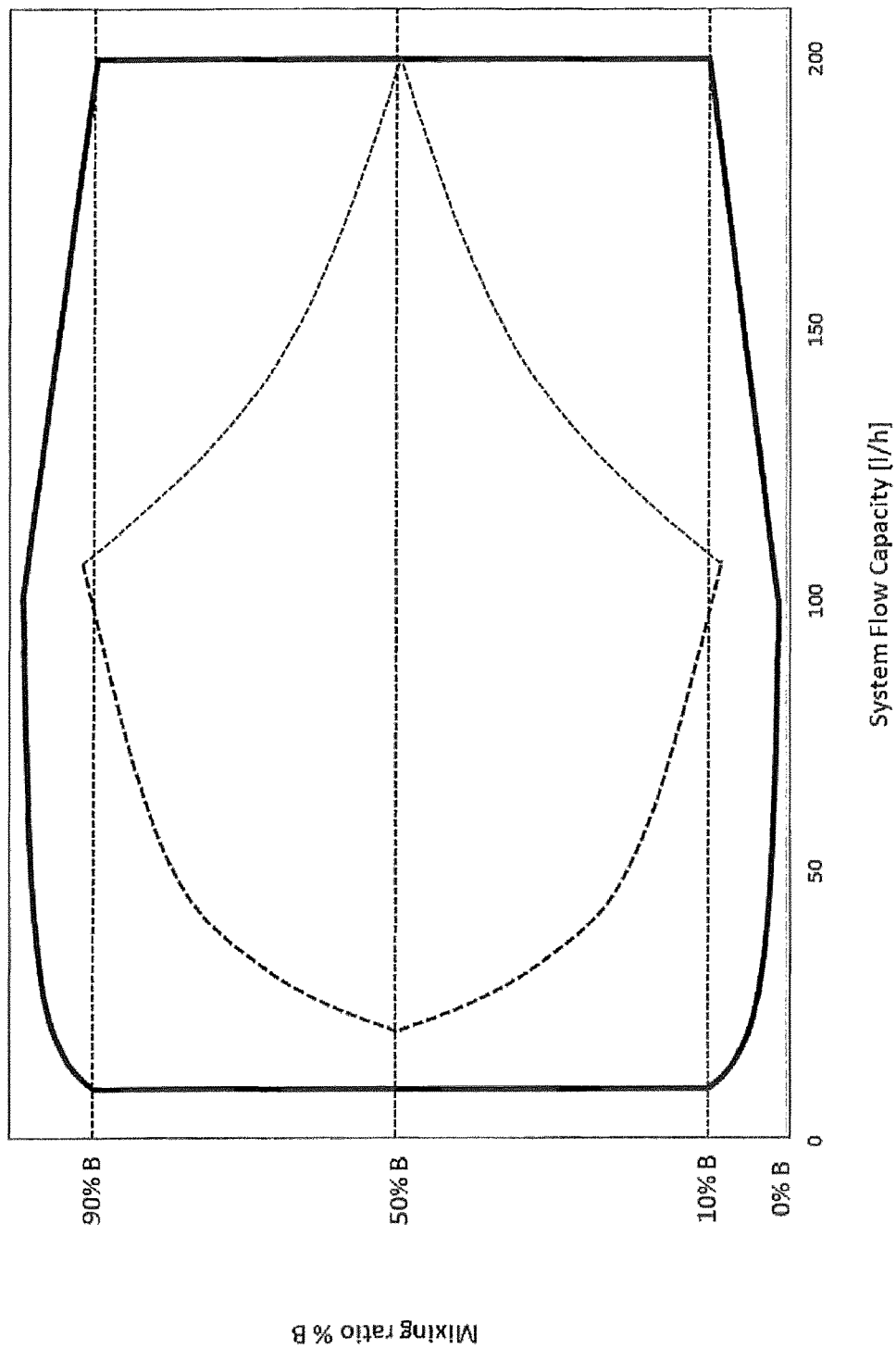
FIG. 4 is a diagram showing the difference in operating range between a prior art fluid mixing system and a fluid mixing system according to the invention.

FIG. 4 is a diagram showing the difference in operating range between a prior art fluid mixing system (dotted line) and a fluid mixing system according to the invention (black, solid line). In the example shown in FIG. 4, systems having two pumps having the same operating ranges (10-100 l/h) are used for illustrating the invention and for illustrating advantages over prior art systems. However, the different pumps in the fluid mixing system according to the invention can as well have different operating ranges.

For prior art systems as the ones described in FIGS. 1a and 1b the system flow capacity is restricted according to the pump capabilities of the respective pumps. If for example two pumps are used both having a pump capability of 10-100 l/h the lowest fluid flow possible to use in the system is 20 l/h and then only a 50% mixing between the first and second fluid is possible. If another mixing ratio is wanted a higher fluid flow needs to be provided. At a fluid flow of 100 l/h all different mixing ratios are possible. For higher fluid flows the mixing ratio needs to be closer and closer to 50%.

According to the new invention described here where at least one valve arrangement 13a; 13a'; 13b is provided upstream of one of the pumps as described above the system flow capacity is increased considerably. Thanks to the possibility to only use one pump and still have the possibility to mix different fluids through the valve arrangement the lowest possible fluid flow is instead equal to the lowest possible fluid flow for one of the pumps, i.e. for example 10 l/h if that is the lower limit for the pumps. The possible proportions of the first and second fluids are dependent on the restrictions of the valve arrangement. For some valve arrangements wider mixing ratios will be possible than for other arrangements, this may depend on the selected valve technology and design. For proportional control valves, the operating range where the valve can be controlled with good accuracy may be limited, for example. Furthermore, for higher flow rates both pumps can be run at their maximum fluid flow rate and by the combined use of the valve arrangement a wider range of mixing ratios, significantly wider than with prior art technology, can be achieved. As a result, the operating window of the system in terms of flow capacity and/or mixing ratios is considerable higher with this invention compared to prior art systems.

According to the invention a bioprocess system 1; 1'; 1"; 101; 101' comprising a bioprocess fluid mixing system 3; 3'; 3"; 103; 103' as described above is also provided. The bioprocess system can for example be a chromatography system 1; 1'; 1"; 101; 101'. The bioprocess system can also for example be a filtration system or a bioreactor system. The bioprocess system may comprise a control system 21 connectable to the at least two pumps 11a, 11b, 11c, 11d, 11e and the at least one valve arrangement 13a; 13a'; 13b; 13c in the fluid mixing system 3; 3'; 3"; 103; 103', wherein said control system 21 further is connected to one or more sensor arrangements 19 in the fluid mixing system 3; 3'; 3"; 103; 103', wherein the control system 21 is configured for providing feedback control of a volumetric mixing ratio between the first and second fluids and/or of a fluid flow rate in the fluid mixing system 3; 3'; 3"; 103; 103' in dependence of output from the sensors arrangements 19.

Figure 5:
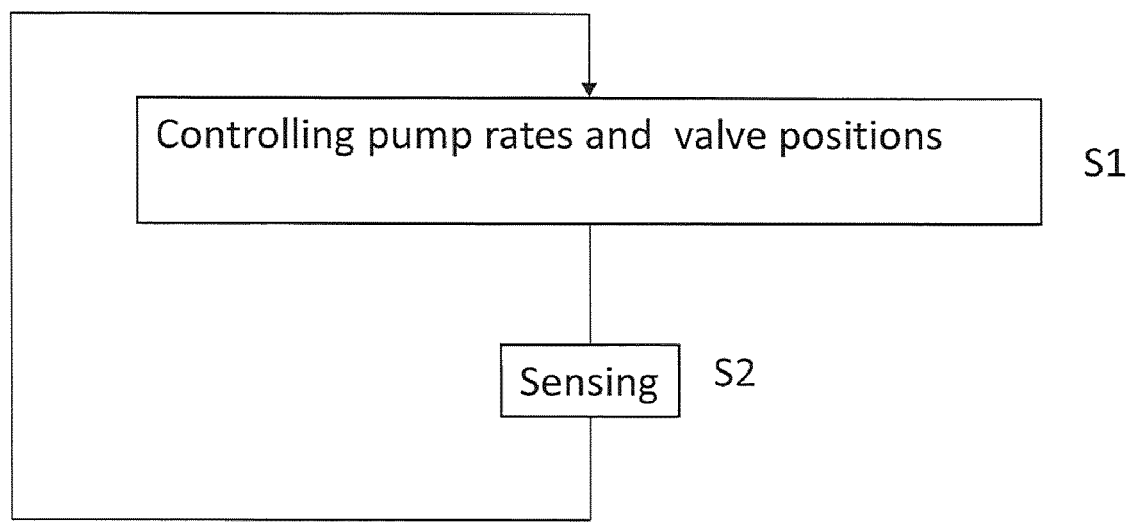
FIG. 5 is a flow chart of a method for mixing fluids in a bioprocess fluid mixing system according to one embodiment of the invention.

According to the invention a method for mixing fluids in a bioprocess fluid mixing system 3; 3'; 3"; 103; 103' as described above is further provided. A flow chart showing some steps in the method is shown in FIG. 5. The method comprises:

S1: Controlling pump rates of the at least two pumps 11a, 11b, 11c, 11d, 11e and valve positions in the at least one valve arrangement 13a; 13a'; 13b; 13c such that mixing of at least a first fluid from the first fluid inlet 5a and a second fluid from the second fluid inlet 5b to a requested mixing of the at least two fluids and to a requested combined fluid flow rate at the common fluid outlet 14 can be performed.

Said method comprises controlling pump rates of the at least two pumps 11a, 11b, 11c, 11d, 11e and valve positions in the at least one valve arrangement 13a; 13a'; 13b; 13c such that mixing of at least a first fluid from the first fluid inlet 5a and a second fluid from the second fluid inlet 5b to a requested mixing of the at least two fluids, such as a requested volumetric mixing ratio and/or a mixing with one or more requested resultant fluid properties and/or a mixing with one or more requested changing resultant fluid properties, and to a requested combined fluid flow rate at the common fluid outlet 14 can be performed both upstream of the first pump 11a and downstream of the first and second pumps 11a, 11b.

The method can for example be a method for gradient formation, buffer preparation, inline conditioning or in-line dilution in a bioprocess system, such as for example a chromatography system.

S2: Sensing at least one property in the fluid at one or more different positions in the fluid mixing system and controlling one or more of the at least two pumps 11a, 11b, 11c, 11d, 11e and the at least one valve assembly 13a; 13a'; 13b; 13c in dependence of the sensed at least one property in order to achieve a requested mixing of the at least two fluids, such as a requested volumetric mixing ratio between at least the first and second fluids and/or a mixing with one or more requested resultant fluid properties and/or a requested combined fluid flow rate. The sensed property can be for example fluid flow rate of the first and/or second fluid and/or fluid flow rate of the mixed fluid or fluid composition, i.e. volumetric mixing ratio of first and second fluids in the mixed fluid. The sensed property can also be pressure, conductivity, temperature or pH.

According to the invention a control system 21 is also provided which is connectable to a bioprocess fluid mixing system 3; 3'; 3"; 103; 103' as described above, wherein said control system 21 is configured to control the at least two pumps 11a, 11b, 11c, 11d, 11e and the at least one valve arrangement 13a; 13a'; 13b; 13c according to the method as described above.

According to the invention a computer program product comprising instructions which, when executed in a processor in a control system 21 connected to a fluid mixing system 3; 3'; 3"; 103; 103' as described above, cause the control system 21 to perform the method as described above is also provided.

The invention provides advantages over prior art technology for preparative applications in biomanufacturing where practices and technology need to comply with requirements of GMP (Good Manufacturing Practices). In order to comply with GMP requirements, the fluid flow path design and its components need to be of sanitary design, allowing to be provided in a clean and controlled state or to be re-conditioned to said state after use and prior to subsequent use. For example, GMP technology may require certain valve technology to be used, such as diaphragm valves or pinch valves. In one embodiment of the invention, a flow path and/or its components may be provided as single-use technology. With single-use technology, flow paths are provided in a clean and ready-to-use state, often as plastic consumables, hereby increasing overall processing efficiency and providing safety and integrity of the drug product. In infectious or hazardous processing steps, such as with certain virus processing steps, single use technology may also increase operator safety. The flow paths may be provided pre-sterilized and fitted with aseptic connectors. An example for an existing GMP compliant preparative single-use chromatography system is AKTA ready by GE Healthcare. The system is available in a gradient configuration to provide a mixing system capability based on two pumps with individual fluid inlets.

Preparative GMP systems for bioprocessing may be of different sizes comprising large scale instrumentation in floor standing designs, such as AKTA ready. However, small scale preparative GMP systems for production of drug substances in small volumes, for example for personalized medicines of individual patients or patient groups, are also needed. The latter systems may be small and positioned on a bench, and single-use technology is preferable.

Typical flow rates of preparative GMP systems for bioprocessing may therefore comprise flow rates of 1 l/h, 10 l/h, 100 l/h and 1000 l/h, however, smaller and larger flow rates may be of interest, too.

The system of the invention can be used for obtaining a mixed output flow suitable for such preparative GMP systems and therefore the system is intended to function over a wide flow range of 0.1 l/h or less, to 1000 l/h or more, depending on the size and scale of the pumps, valves and fluid interconnections used, but typically will be in the range of 3-500 l/h for example for the ÄKTA Ready system mentioned above.

The invention claimed is:

1. A bioprocess fluid mixing system, said fluid mixing system comprising:
   at least two fluid inlets, configured for providing a first fluid into the fluid mixing system through a first fluid inlet and for providing a second fluid into the fluid mixing system through a second fluid inlet;
   at least one valve arrangement, where a first valve arrangement is in fluid communication with at least both the first fluid inlet and the second fluid inlet;
   at least two pumps, where a first pump is in selective fluid communication with at least both the first and the second fluid inlets via the first valve arrangement and a second pump is in fluid communication with at least one of the first and second fluid inlet; and
   a common fluid outlet which is in fluid communication with at least an outlet of the first pump and an outlet of the second pump,
   wherein pump rates of the at least two pumps and valve positions in the at least one valve arrangement are configured to be controllable by a control system such that mixing of at least a first fluid from the first fluid inlet and a second fluid from the second fluid inlet can be performed to a requested mixing of the at least two fluids and to a requested combined fluid flow rate at the common fluid outlet, and
   wherein said fluid mixing system is further operable to mix fluids both upstream and downstream of the first and second pumps.

2. Bioprocess fluid mixing system according to claim 1, wherein pump rates of the at least two pumps and valve positions in the at least one valve arrangement are configured to be controllable by a control system such that mixing of at least a first fluid from the first fluid inlet and a second fluid from the second fluid inlet to the requested mixing of the at least two fluids and to a requested combined fluid flow rate at the common fluid outlet can be performed upstream of at least the first pump, and downstream of the at least two pumps at the same time, or selectively at different times.

3. Bioprocess fluid mixing system according to claim 1, wherein the requested mixing of the at least two fluids is a requested volumetric mixing ratio of the at least two fluids and/or a mixing with one or more requested resultant fluid properties and/or a mixing with one or more requested changing resultant fluid properties.

4. Bioprocess fluid mixing system according to claim 3, wherein a requested resultant fluid property or changing resultant fluid property is a resultant pH.

5. Bioprocess fluid mixing system according to claim 1, wherein the second pump is connected to both the first and second fluid inlets via a second valve arrangement provided in the fluid mixing system.

6. Bioprocess fluid mixing system according to claim 1, wherein the fluid mixing system is configured for gradient formation, buffer preparation or inline conditioning in a bioprocessing system.

7. Bioprocess fluid mixing system according to claim 1, wherein the at least one valve arrangement comprises at least two inlets and one outlet.

8. Bioprocess fluid mixing system according to claim 1, further comprising a mixer connected to the common fluid outlet.

9. Bioprocess fluid mixing system according to claim 1, further comprising at least one sensor arrangement which is connectable to the control system, said sensor arrangement being configured for measuring one or more fluid properties of the mixed at least first and second fluids and/or fluid flow rates in one or more positions in the system, whereby a control system can provide a feedback control to the at least tow pumps and/or to the at least one valve arrangement based on output from the sensor arrangement.

10. A method for mixing fluids in a bioprocess fluid mixing system according to claim 1, wherein said method comprises controlling pump rates of the at least two pumps and valve positions in the at least one valve arrangement such that mixing of the at least a first fluid from the first fluid inlet and a second fluid from the second fluid inlet to a requested mixing of the at least two fluids and to a requested combined fluid flow rate at the common fluid outlet can be performed both upstream of the first pump and downstream of the pumps.

11. Method according to claim 10, wherein said method comprises controlling pump rates of the at least two pumps and valve positions in the at least one valve arrangement such that mixing of at least a first fluid from the first fluid inlet and a second fluid from the second fluid inlet to a requested mixing of the at least two fluids and to a requested combined fluid flow rate at the common fluid outlet can be performed both upstream of the first pump and downstream of the pumps.

12. Method according to claim 10, wherein the method is a method for gradient formation, buffer preparation or inline conditioning in a bioprocess system.

13. Method according to claim 10, further comprising the steps of sensing at least one property in the fluid at one or more different positions in the fluid mixing system and controlling one or more of the at least two pumps and the at least one valve arrangement in dependence of the sensed at least one property in order to achieve a requested mixing between at least the first and second fluids and/or a requested combined fluid flow rate.

14. A bioprocess system comprising a bioprocess fluid mixing system according to claim 1.

15. Bioprocess system according to claim 14, wherein said bioprocess system is a chromatography system.

16. Bioprocess system according to claim 14, further comprising a control system connectable to the at least two pumps and the at least one valve arrangement in the fluid mixing system, wherein said control system further is connected to one or more sensor arrangements in the fluid mixing system, wherein the control system is configured for providing feedback control of a volumetric mixing ratio between at least the first and second fluids and/or of a fluid flow rate in the fluid mixing system in dependence of output from the sensor arrangements.

17. A control system connectable to a bioprocess fluid mixing system according to claim 1, wherein said control system is configured to control the at lest two pumps and the at least one valve arrangement.

18. A computer program product comprising instructions which, when executed in a processor in a control system connected to a fluid mixing system according to claim 1, cause the control system to perform the mixing.

* * * * *